United States Patent
Chatterjee et al.

(10) Patent No.: US 11,409,701 B2
(45) Date of Patent: Aug. 9, 2022

(54) EFFICIENTLY PROCESSING CONFIGURABLE CRITERIA

(71) Applicant: SAP SE, Walldorf (DE)

(72) Inventors: Snigdhaman Chatterjee, Burdwan (IN); Shivaprasad Kodlipet Chandrashekhar, Bangalore (IN); Hemanth Rajeswari Anantha, Bangalore (IN); Debashis Banerjee, Bengaluru (IN); Hari Babu Krishnan, Bangalore (IN)

(73) Assignee: SAP SE, Walldorf (DE)

( * ) Notice: Subject to any disclaimer, the term of this patent is extended or adjusted under 35 U.S.C. 154(b) by 324 days.

(21) Appl. No.: 16/534,451

(22) Filed: Aug. 7, 2019

(65) Prior Publication Data

US 2021/0042264 A1 Feb. 11, 2021

(51) Int. Cl.
*G06F 17/00* (2019.01)
*G06F 16/13* (2019.01)
*G06F 16/11* (2019.01)

(52) U.S. Cl.
CPC .............. *G06F 16/13* (2019.01); *G06F 16/11* (2019.01)

(58) Field of Classification Search
None
See application file for complete search history.

(56) References Cited

U.S. PATENT DOCUMENTS

| | | | |
|---|---|---|---|
| 7,035,754 B2* | 4/2006 | Starzyk | G06K 9/6217 702/120 |
| 7,146,331 B1 | 12/2006 | Young | |
| 7,350,698 B2 | 4/2008 | Viswanath et al. | |
| 8,904,047 B1* | 12/2014 | Kornfeld | G06F 3/0611 710/7 |
| 9,836,773 B2 | 12/2017 | Bhojwani et al. | |

(Continued)

FOREIGN PATENT DOCUMENTS

CN  108074078 A  5/2018

OTHER PUBLICATIONS

Apptio, Inc., "A Lifecycle Approach to IT Vendor Portfolios," 4 pages, 2017.

(Continued)

*Primary Examiner* — Hasanul Mobin
(74) *Attorney, Agent, or Firm* — Sterne, Kessler, Goldstein & Fox P.L.L.C.

(57) ABSTRACT

Disclosed herein are computer-implemented method, system, and computer-program product (computer-readable storage medium) embodiments for efficiently processing configurable criteria. An embodiment includes at least one computer processor configured to receive a first configuration corresponding to a plurality of attributes, access a data set of one or more items, and compute a first key based at least in part on the first configuration. In a further embodiment, the at least one computer processor may be configured to populate a first set of selected items based at least in part on the first key, and may further be further configured to output the first set of selected items. The first key may uniquely correspond to the first configuration, and the first set of selected items may include any item, of the data set of one or more items, selected based at least in part on the first key, according to some embodiments.

20 Claims, 10 Drawing Sheets

(56) References Cited

U.S. PATENT DOCUMENTS

| | | | |
|---|---|---|---|
| 9,836,794 B2 | 12/2017 | Hopkins | |
| 2003/0101117 A1 | 5/2003 | Dietz et al. | |
| 2007/0058865 A1* | 3/2007 | Li | G06T 7/162 |
| | | | 382/173 |
| 2008/0046474 A1* | 2/2008 | Sismanis | G06F 16/217 |
| 2009/0136103 A1* | 5/2009 | Sonka | G06V 10/457 |
| | | | 382/128 |
| 2010/0082511 A1* | 4/2010 | Niu | G06N 3/0445 |
| | | | 707/E17.014 |
| 2013/0097680 A1* | 4/2013 | Bendapudi | G06F 21/335 |
| | | | 709/213 |
| 2013/0226909 A1* | 8/2013 | Katsunuma | G06F 16/248 |
| | | | 707/722 |
| 2013/0317942 A1 | 11/2013 | Cullen, III | |
| 2014/0108072 A1 | 4/2014 | McGowan et al. | |
| 2014/0229816 A1* | 8/2014 | Yakub | G06F 40/169 |
| | | | 715/230 |
| 2016/0210181 A1* | 7/2016 | Kikuchi | G06F 11/079 |
| 2017/0161809 A1* | 6/2017 | Dubey | G06F 16/24578 |
| 2017/0187820 A1* | 6/2017 | Vangala | H04L 45/54 |
| 2018/0137219 A1* | 5/2018 | Goldfarb | G06N 3/126 |
| 2020/0133751 A1* | 4/2020 | Bahrami | G06F 8/74 |

OTHER PUBLICATIONS

Oracle, "Oracle Fusion Procurement," 96 pages, 2011.
Perdue, P., "On Compliance: Smart Vendor Management Goes Beyond The Basics," CU Management, Credit Union Executives Society (CUES), 4 pages, Jan. 24, 2019.

* cited by examiner

200

| Line Item | Type | Material | Region | Department | Material ID | Locality | Supplier |
|---|---|---|---|---|---|---|---|
| 1 | Electronics | Laptop | USA | Engineering | 100 | Minnesota | Supplier 1 |
| 2 | Electronics | Laptop | USA | Science | 100 | Michigan | Supplier 1 |
| 3 | Electronics | Laptop | EU | Science | 100 | Germany | Supplier 1 |
| 4 | Electronics | Tablet | USA | Manufacturing | 200 | Minnesota | Supplier 1 |
| 5 | Electronics | Laptop | USA | Engineering | 200 | Minnesota | Supplier 2 |
| 6 | Electronics | Tablet | USA | Manufacturing | 200 | Michigan | Supplier 2 |
| 7 | Electronics | Tablet | EU | Manufacturing | 200 | Germany | Supplier 2 |
| 8 | Electronics | Tablet | EU | Manufacturing | 200 | Germany | Supplier 1 |

| Line Item | Type | Material | Region | Department | Material ID | Locality | Supplier |
|---|---|---|---|---|---|---|---|
| 1 | Electronics | Laptop | USA | Engineering | 100 | Minnesota | Supplier 1 |
| 2 | Electronics | Laptop | USA | Science | 100 | Michigan | Supplier 1 |
| 3 | Electronics | Laptop | EU | Science | 100 | Germany | Supplier 1 |
| 4 | Electronics | Tablet | USA | Manufacturing | 200 | Minnesota | Supplier 1 |
| 5 | Electronics | Laptop | USA | Engineering | 200 | Minnesota | Supplier 2 |
| 6 | Electronics | Tablet | USA | Manufacturing | 200 | Michigan | Supplier 2 |
| 7 | Electronics | Tablet | EU | Manufacturing | 200 | Germany | Supplier 2 |
| 8 | Electronics | Tablet | EU | Manufacturing | 200 | Germany | Supplier 1 |

FIG. 3

Supplier Qualification Demo (CW2515)
Contract v1 (Published)

Exit | Amend

Summary

Description
No Description provided

Material
Electrical line heaters

Region*
USA

Department*
Science

Term type*
Fixed

Last amendment started date
----

Supplier*
InfoPymeB2B, S.L.

Currency*
US Dollar

Creation Date
Jun 29, 2019

Last modified date
----

Contract amount*
$20,000.00

First published date
----

Last published date
Jun 30, 2019

Create — Draft — Published ----- Closed

To Review
Effective Period

From
Jan 1, 2020

▶ Supplier Eligibility Criteria ⓘ

500

Minimum supplier status for creation: ⓘ
InCreation (Direct Material Qualification)
ConditionallyApproved (Direct Material Qualification)
PendingDecision (Direct Material Qualification)
Approved (Direct Material Qualification)
InProgress (Direct Material Qualification)

Minimum supplier status for publication: ⓘ
ConditionallyApproved (Direct Material Qualification)
PendingDecision (Direct Material Qualification)
Approved (Direct Material Qualification)
InProgress (Direct Material Qualification)

Minimum supplier status for ERP integration: ⓘ
ConditionallyApproved (Direct Material Qualification)
Approved (Direct Material Qualification)

FIG. 5

Edit template eligibility criteria settings.

▼ Supplier Eligibility Criteria ⓘ

600

Minimum supplier status for creation:
- ☐ Audit Pending Decision (Audit Process) ⓘ
- ☐ Audit Conditionally Approved (Audit Process)
- ☐ DS Conditionally Approved (DataSecurity)
- ☐ DS Pending Decision (DataSecurity)
- ☑ InCreation (Direct Material Qualification)
- ☐ Audit In Creation (Audit Process)
- ☐ Audit In Progress (Audit Process)
- ☐ Audit Failed (Audit Process)
- ☐ Audit Created (Audit Process)
- ☐ Failed (Direct Material Qualification)
- ☐ ConditionallyApproved (Indirect Qualification)
- ☐ Audit Denied (Audit Process)
- ☐ Denied (Direct Material Qualification)
- ☐ Audit Qualified (Audit Process)
- ☑ ConditionallyApproved (Direct Material Qualification)
- ☑ Pending Decision (Direct Material Qualification)
- ☑ Approved (Direct Material Qualification)
- ☑ InProgress (Direct Material Qualification)

Minimum supplier status for publication:
- ☐ Audit Pending Decision (Audit Process) ⓘ
- ☐ Audit Conditionally Approved (Audit Process)
- ☐ DS Conditionally Approved (DataSecurity)
- ☐ DS Pending Decision (DataSecurity)
- ☑ InCreation (Direct Material Qualification)
- ☐ Audit In Creation (Audit Process)
- ☐ Audit In Progress (Audit Process)
- ☐ Audit Failed (Audit Process)
- ☐ Audit Created (Audit Process)
- ☐ Failed (Direct Material Qualification)
- ☐ ConditionallyApproved (Indirect Qualification)
- ☐ Audit Denied (Audit Process)
- ☐ Denied (Direct Material Qualification)
- ☐ Audit Qualified (Audit Process)
- ☑ ConditionallyApproved (Direct Material Qualification)
- ☑ Pending Decision (Direct Material Qualification)
- ☑ Approved (Direct Material Qualification)
- ☑ InProgress (Direct Material Qualification)

Minimum supplier status for ERP integration:
- ☐ Audit Pending Decision (Audit Process) ⓘ
- ☐ Audit Conditionally Approved (Audit Process)
- ☐ DS Conditionally Approved (DataSecurity)
- ☐ DS Pending Decision (DataSecurity)
- ☐ InCreation (Direct Material Qualification)
- ☐ Audit In Creation (Audit Process)
- ☐ Audit In Progress (Audit Process)
- ☐ Audit Failed (Audit Process)
- ☐ Audit Created (Audit Process)
- ☐ Failed (Direct Material Qualification)
- ☐ ConditionallyApproved (Indirect Qualification)
- ☐ Audit Denied (Audit Process)
- ☐ Denied (Direct Material Qualification)
- ☐ Audit Qualified (Audit Process)
- ☑ ConditionallyApproved (Direct Material Qualification)
- ☐ Pending Decision (Direct Material Qualification)
- ☑ Approved (Direct Material Qualification)
- ☐ InProgress (Direct Material Qualification)

FIG. 6

To Review
Effective Period

From
Jan 1, 2020

To
Jan 31, 2020

Prenegotiated Line Items

Validate | Publish

Items for pricing

| | Item Name | Price | Quantity | Extended Price | Supplier | M |
|---|---|---|---|---|---|---|
| ☐ | 1.0 Item 1 | 20,000 USD | 100 each | 2,000,000 USD *Fx* | InfoPymeB2B, S.L. | |
| ☐ | 2.0 Item 2 | 200 USD | 200 each | 40,000 USD *Fx* ⌄ | InfoPymeB2B, S.L. | |
| ☐ | 3.0 Item 3 | 1,000 USD | 1000 each | 1,000,000 USD *Fx* ⌄ | InfoPymeB2B, S.L. | |
| ☐ | 4.0 Item 4 | 500 USD | 50000 each | 25,000,000 USD *Fx* ⌄ | InfoPymeB2B, S.L. | |

| Prenegotiated Line Items | | | | | | Validate | Publish |
|---|---|---|---|---|---|---|---|
| V2 (Published) Items for pricing | | | | | 🔖 | ... | |
| | Item Name | Price | Quantity | Extended Price | | Material Number | Loc |
| ☐ | 1.0 Item 1 | | | ⚠ Something went wrong ✕ | SD | 1 | |
| ☐ | 2.0 Item 2 | | | InfoPymeB2B, S.L. The selected supplier is not qualified 1.0 – Item 1 | Ex ∨ | 2 | |
| ☒ | 3.0 Item 3 | | | InfoPymeB2B, S.L. The selected supplier is not qualified 3.0 – Item 3 | SD | 3 | |
| ☒ | 4.0 Item 4 | | | InfoPymeB2B, S.L. The selected supplier is not qualified 4.0 – Item 4 | SD | 4 | |
| | | | | OK | | | ... |
| toReview Documents | | | | | | | |
| Expand All +1.0 | | | | | | | |

FIG. 8

EFFICIENTLY PROCESSING CONFIGURABLE CRITERIA

BACKGROUND

Traditional techniques for processing large lists or complex sets of line-item data, where processing may entail application of arbitrary criteria to the data, may often involve manual scrutiny of lines or attributes therein, along with comparisons against external criteria. To the extent that these techniques can be automated with conventional technology, such automation typically involves computerized evaluations, e.g., data retrieval and comparison, that may mimic human evaluation. However, such conventional techniques do not scale efficiently for large and/or complex data sets. Even use of more sophisticated database management systems (DBMS), or other state-of-the-art technologies for data storage and retrieval, may result in considerable overhead with relatively slow, computationally intensive, and/or inefficient processing.

BRIEF DESCRIPTION OF THE DRAWINGS

The accompanying drawings are incorporated herein and form a part of the specification.

FIG. 2 is a chart of an example data set, including lines of values as attributes, before processing, according to some embodiments.

FIG. 3 is a chart of the example data set of FIG. 2 after processing, according to some embodiments.

FIG. 4 is a screenshot of an example display of status, according to some embodiments.

FIG. 5 is a screenshot of an example display of criteria, according to some embodiments.

FIG. 6 is a screenshot of an example menu display to configure criteria, according to some embodiments.

FIG. 7 is a screenshot of an example output display, according to some embodiments.

FIG. 8 is a screenshot of an example notification display, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for efficiently processing configurable criteria.

In some embodiments, there may be a user-defined set of customizable attributes. These attributes may be varied for different stages of evaluation, for example. Criteria may be applied to a data set, such as line-item documents with any number of lines. Additionally, or alternatively, row-oriented databases, column-oriented databases, unstructured data stores, or any combination thereof, may be used as a data set. The same criteria may also be applicable to multiple data sets, for example.

Processing attributes to data sets may allow determination of elements that meet certain criteria defined by any or all of the attributes. For example, a line-item document may be a structured data store including lines each having a given number of values, similar to rows in a column-oriented database. The given number of values may correspond to attributes, and specific values of the attributes may be compared with user-defined criteria.

In a further example, a first value of a line may correspond to a first attribute such as a part number, and a first criterion corresponding to the first attribute may be "equal to 100" or equivalent. Thus, applying the first criterion to a data set may involve a determination of lines or rows in which the first value is equal to 100, in this example. Other criteria may be implemented, such as a value per se, and comparator signals, e.g., equal to, greater than, less than, etc., may be applied separately from criteria, in some embodiments.

In a more complex example, multiple criteria may be specified and applied to each line, row, or other element, in a given data set or multiple data sets. In further complex examples, multiple criteria may be dynamic, changing over time, varying for multiple stages of a separate process, or a combination of these changes and variations, for example.

In the cases of these complex examples, use of conventional database techniques, if even feasible, may become time-consuming, resource-intensive, inefficient, or otherwise impractical. To solve such technical problems stemming from limitations of conventional database techniques, enhanced techniques are described herein to achieve faster, lighter, and/or more efficient processing of configurable criteria, providing effective technical solutions according to some embodiments.

In some cases, benefits of these enhanced techniques may be realized in application of various criteria to large or complex data sets such as those described above. Examples described herein may be understood in context of any algorithms, data structures, and/or practical applications, but such examples are not intended to limit the scope of this disclosure.

Figure 1:
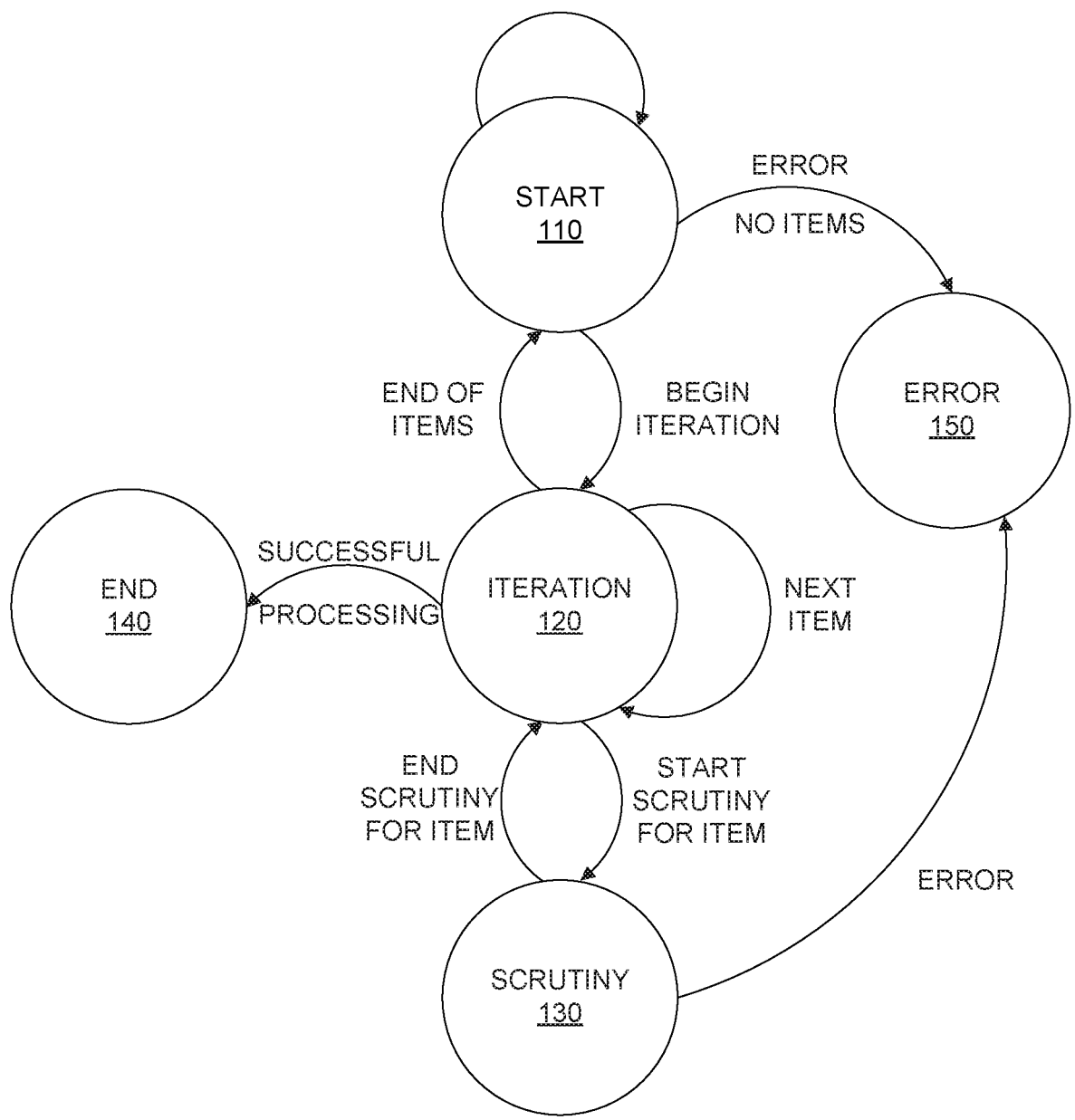
FIG. 1 is a state diagram illustrating an example interaction with a data set by applying a scrutiny algorithm, according to some embodiments.
Figure 9:
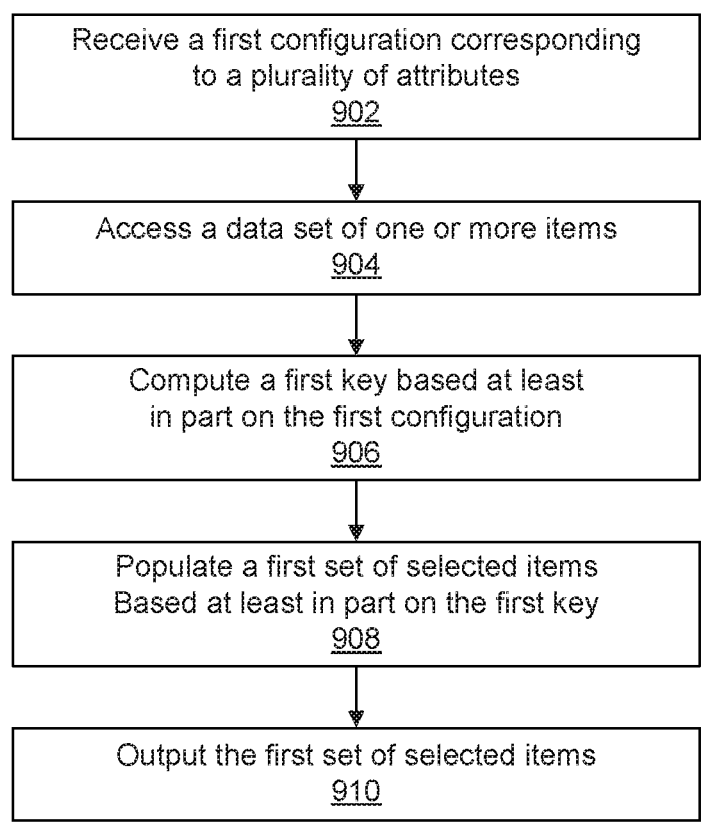
FIG. 9 is a flowchart illustrating a process implementing some of the enhanced techniques described herein, according to some embodiments.

FIG. 1 is a state diagram 100 illustrating an example interaction with a data set, e.g., of FIG. 2, by applying a scrutiny algorithm, e.g., including method 900 of FIG. 9, according to some embodiments. These components may further include at least one processor and memory such as those of FIG. 10. As a practical implementation, any transition or action orchestrated between any states shown in FIG. 1 may, in some embodiments, be treated as an example of any corresponding step in method 900 implementing enhanced techniques described herein for efficiently processing configurable criteria, according to some embodiments.

Start 110 may represent an initial state, for example. Start 110 may be specifically initialized to a designated starting point, break point, return point, etc., with respect to execution of a given algorithm, in some embodiments. Additionally, or alternatively, start 110 may be an arbitrary point in an execution path at which execution may branch into an iteration or loop, such as by a transition to iteration 120, given a data set that includes at least one member element, e.g., item. Absent a data set, start 110 may spin in a holding state awaiting a data set as input, in some embodiments. Additionally, or alternatively, start 110 may branch or return to a different execution path. Given a data set that is null, such as that includes no member elements, e.g., no items, execution may branch, fault, error out, or otherwise transition state to error 150.

Iteration 120 may include a process, routine, loop, iterator, generator, coroutine, thread, subprocess, subroutine, subthread, recursion, or comparable procedural or functional construct by which a data set may have an operation applied to one or more of its member elements. Member elements of a given data set may be line items, for example, or any attributes thereof and/or values therein, according to some embodiments. Any step of iteration 120 may branch, iterate, recurse, invoke, or otherwise execute at least one algorithm, such as scrutiny 130. In some embodiments, iteration 120 and/or the at least one algorithm may be batched and/or divided across the given data set for parallel execution by at least one processor 1004 and/or any number of physical or logical processor cores thereof, for example.

Scrutiny 130 may include at least one determination of whether a given member element, chosen from the given data set by iteration 120, satisfies or fails to satisfy at least one criterion or set of criteria, which may be configurable, as described further below with respect to FIGS. 6 and 9, in some embodiments. As described further below with respect to method 900 of FIG. 9, for example, scrutiny 130 may compare at least one key with a given member element, or a part or transformation thereof, according to some embodiments, in order to populate at least one set of selected items and/or at least one set of complementary items. Any other algorithm(s) may be performed sequentially or concurrently alongside scrutiny 130, including any hashing function or other mathematical transform algorithm, for example.

With each instance or step of iteration 120, scrutiny 130 may be discretely transitioned to and from (e.g., start and end between 120 and 130), in some embodiments. In some embodiments, iteration 120 and scrutiny 130 may overlap partially or fully, sharing the same execution state for some, most, or all cases of execution of iteration 120 and/or scrutiny 130. Once all (or a predetermined number of) instances of member elements of the given data set have been traversed by iteration 120 and/or otherwise processed by the algorithm(s) of scrutiny 130, execution may transition state to end 140, indicating successful completion of processing. If, for any reason, processing of iteration 120 and/or scrutiny 130 fails or is otherwise not successful, execution may transition state to error 150, for example.

End 140 may include logic to branch or return to another execution state, such as start 110, or another separate execution path, for example. In some embodiments, end 140 may include further logic to add, update, or otherwise modify indicators of status or algorithmic output (e.g., from scrutiny 130) to the given data set, to an output set of selected items, and/or to a separate set of indicators, for example. Indicators may indicate qualification according to a specified set of criteria with a given configuration, according to some embodiments, as also described further herein.

Error 150 may include logic to output notifications or populate and/or output sets of selected items, complementary items, or a combination thereof. Additionally, or alternatively, error 150 may include further logic to add, update, or otherwise modify indicators of status or algorithmic output (e.g., from scrutiny 130) to the given data set, to an output set of selected items, and/or to a separate set of indicators, for example. Indicators may indicate qualification according to a specified set of criteria with a given configuration, according to some embodiments, as also described further herein.

Other programs, protocols, or architectures similarly configured to deliver the same results also fall within the spirit and scope of this disclosure. FIG. 2 shows one non-limiting example of a state diagram, but other configurations may be realized within the scope of the claims attached hereto.

FIG. 2 is a chart 200 of an example data set, including lines of values as attributes, before processing, according to some embodiments. This example includes a line-item number, which may function as a unique identifier for any given line, which may correspond to an item in the data set. An item thus may be a member element of a given data set and may be characterized by one or more attributes, which may be defined or described by values in one or more additional columns for a given line item, for example.

In some embodiments, and for illustrative purposes in FIG. 2, certain member elements (items) of a data set as displayed by an output may be highlighted, shaded, colored, shadowed, or otherwise visually distinguished, based on a given attribute value. In FIG. 2, items having "Supplier 1" as a supplier attribute may be brightly highlighted (lines of blank background in FIG. 2: line items 1-4 and 8), whereas items having "Supplier 2" as a supplier attribute may be more darkly shaded (lines of stippled background in FIG. 2: line items 5-7).

However, this type of selection is explicitly tied to values of one attribute, as shown in FIG. 2 in this example, and may not reflect selection in accordance with more complex criteria, which may be based at least in part on combinations of attributes having any of one or more specific combinations of values, for example. Iterative or recursive computation and selection of elements that satisfy complex criteria may become slow, burdensome, and inefficient, if not impossible to perform automatically (at least within certain constraints), thereby potentially requiring manual intervention, having human reviewers evaluate data sets with complex criteria, introducing risk of mistakes.

These burdens and risks may be amplified for larger data sets, more complex criteria, or a combination thereof. Moreover, as criteria change over time, e.g., for different stages of a qualification process or as users reconfigure criteria for any other reason, recalculating items that satisfy the new criteria may be further taxing, repeating the same onerous process. Advantageous solutions are described further herein, at least with respect to FIG. 1 and FIG. 9, for example, among other descriptions herein with benefits that will be appreciated by those skilled in the related arts. Desired output for a certain set of criteria may be illustrated in FIG. 3, according to some example embodiments.

FIG. 3 is a chart 300 of the example data set of FIG. 2 after processing, e.g., per FIG. 1 and/or FIG. 9, according to some embodiments. The data set may represent line items of a draft contract, for example. A set of criteria may include given standards for qualification as applied to certain values of the supplier attribute, in this embodiment. For example, Supplier 1 may be qualified to supply laptops only in one geographic scope (e.g., USA, Michigan) and to supply tablets only in another geographic scope (e.g., EU, Germany), whereas Supplier 2 may be qualified to supply tablets (but not laptops or other material types/values in the data set), and only in a different geographic scope (e.g., USA, all localities). Applying this set of criteria yields a different set of selected items, as shown in FIG. 3.

In some embodiments, and for illustrative purposes in FIG. 3, certain member elements (items) of a data set as displayed by an output may be highlighted, shaded, colored, shadowed, or otherwise visually distinguished, based on a given attribute value. In FIG. 3, qualified items (e.g., items that the supplier of the item is qualified to sell in a target locality) may be brightly highlighted (lines of blank background in FIG. 2: line items 2, 6, and 8), whereas non-qualified items (e.g., items that the corresponding supplier is not qualified to supply) may be more darkly shaded (lines of stippled background in FIG. 2: line items 1, 3-5, and 7).

For illustrative purposes, while the set of criteria applied to the data set of FIG. 3 may be of manageable complexity for manual or automated methods of determining qualification, such methods may become difficult to impossible, within reasonable constraints, for data sets and/or criteria of considerably greater complexity, where processing time requirements may be on orders of exponential to factorial growth, for example, depending on criteria, which may not scale manageably for larger data sets.

However, by applying enhanced techniques as described herein, time complexity of solving such qualification problems (e.g., processing results shown in FIG. 3) may be reduced to linear time, e.g., $O(m)+O(m \cdot n)$, for a data set of size n items across a set of m status scenarios, where a given status may have any number of criteria or sets of criteria, for example. At least by transforms described with respect to method 900 of FIG. 9 below, complexity of criteria may be reduced, even to the point where selection for multiple status scenarios (e.g., including varied or modified sets of criteria) may be feasible and may be as efficient as for one status scenario. Status scenarios may involve various stages or phases, e.g., of approval, publication, etc., as steps toward validation or entry into an enterprise resource planning (ERP) system, for example. Additional examples of enhanced techniques for efficiently processing configurable criteria are described further herein.

FIG. 4 is a screenshot of an example display 400 of status, according to some embodiments. Display 400 may be a rendering of a GUI, which may be part of a web-based user interface, for example. As with other GUI examples, menus, buttons, and/or other icons may be present as handles for a user to interact.

Additionally, information may be displayed, such as attributes relating to a data set and/or individual or composite values of specified line-item instance(s) of the data set, for example. In this example display 400, attributes and values displayed may relate to a contract being prepared for entry into an ERP system, as a non-limiting example. A timeline or progress bar may show various stages of review or scrutiny that the contract has passed, is undergoing, and may still be needed, per bubbles or checkboxes, for example, representing configurable criteria, as described further herein.

FIG. 5 is a screenshot of an example display 500 of criteria, according to some embodiments. The criteria displayed in display 500 may represent a read-out of a current configuration of configurable criteria, for example. A group of criteria may be selected for a given status scenario, e.g., creation, publication, ERP integration, etc. For any of these status scenarios, different criteria may be designated as (minimum) requirements, for example. In some embodiments, different criteria may include different values for certain attributes, different attributes, etc., which may change over time, and which may be configurable by various inputs. Configuration of criteria is described in further detail herein.

In this case, for illustrative purposes, a box is drawn around qualification criteria in the ERP integration status scenario, which differ from the qualification criteria in other scenarios, in that where qualification, e.g., of supplier(s) for a given draft contract, is pending decision or otherwise in progress, such supplier(s) or contract would not be integrated or entered into an ERP system, thus requiring some form of approval, in this example, according to some embodiments.

FIG. 6 is a screenshot of an example menu display 600 to configure criteria, according to some embodiments. Menu display 600 may be a rendering of a GUI, which may be part of a web-based user interface, for example, including checkboxes within a list of criterion items arranged for selection. From this menu display 600, a user or ERP system administrator, for example, may be able to select required criteria for specific status scenarios. Additionally, in some embodiments, menus, dialogs, or other editor elements (not shown) may allow a user or ERP system administrator to define custom criteria, specify attributes and corresponding values or ranges of values required for meeting certain criteria (e.g., qualification), or the like.

FIG. 7 is a screenshot of an example output display 700, according to some embodiments. Output display 700 may be configured to show data sets or subsets thereof, such as for sets of selected items or sets of complementary items, for example. Output display 700 may be a rendering of a GUI, which may be part of a web-based user interface, for example, which may further include configuration options allowing a user to choose attributes by which to sort a data set or values to select a narrower subset of data, for example, any of which may be similar to the data set shown in chart 200 of FIG. 2, in an embodiment. Additionally, or alternatively, items for output display 700 may be selected based at least in part on more complex criteria, which may be configured as described further elsewhere herein, according to some embodiments.

FIG. 8 is a screenshot of an example notification display 800, according to some embodiments. Notification display 800 may be a rendering of a GUI, which may be part of a web-based user interface, for example, which may further include a popup or modal dialog indicating an error and displaying an error message, for example. In some embodiments, when criteria are applied to select items of a data set, any items not selected may form a set of complementary items (e.g., a set of non-selected items versus a set of selected items, or vice-versa), and the set of complementary items may be displayed in a notification display, according to one non-limiting example. Notification display 800 and/or displays of sets of selected or complementary items may take any suitable form for display of a given data set or subset, as will be appreciated by those skilled in the art. Other comparable or equivalent embodiments for notification display 800 are conceivable within the scope of this disclosure.

FIG. 9 is a flowchart illustrating a method 900 for operation of the enhanced database platform integration techniques described herein, according to some embodiments. Method 900 may be performed by processing logic that may comprise hardware (e.g., circuitry, dedicated logic, programmable logic, microcode, etc.), software (e.g., instructions executing on a processing device), or a combination thereof. Not all steps of method 900 may be needed in all cases to perform the enhanced techniques disclosed herein. Further, some steps of method 900 may be performed simultaneously, or in a different order from that shown in FIG. 9, as will be understood by a person of ordinary skill in the art.

Method 900 shall be described with reference to FIGS. 9 and 10. However, method 900 is not limited only to those example embodiments. The steps of method 900 may be performed by at least one computer processor coupled to at least one memory device. An exemplary processor and memory device(s) are described below with respect to FIG. 10. In some embodiments, method 900 may be performed by components of computer system 1000 of FIG. 10, which may include at least one processor and memory such as those of FIG. 10.

In 902, at least one processor 1004 may be configured to receive a first configuration corresponding to a plurality of attributes. In some embodiments, a configuration may correspond to one or more criteria. Additionally, or alternatively, a configuration may correspond to at least one value for one or more attributes.

In some embodiments, a configuration may include criteria, attributes, values, or any combination thereof, which may be configured or reconfigured by a user via a user interface, for example. Additionally, or alternatively, configuration values, such as for criteria and/or attributes, may be set or otherwise configured or reconfigured programmatically, such as via an application programming interface (API). An example of API-based configuration may be via a script that retrieves configuration values from a predetermined database or repository, in some embodiments.

Another example of API-based configuration may be to enable separate user interfaces, which may be developed and/or hosted by third parties, for example. User interfaces may include web-based front-end solutions or device-native applications, and may include a graphical user interface (GUI), terminal, textual, or text-based user interface (TUI), command-line interface (CLI), or any combination of the above interfaces, which may be front ends utilizing one or more APIs. Further embodiments may include interfaces configured to react to a voice command, a gesture, accelerometer input, wireless signal (including light, infrared, UV, NFC, RFID, Wi-Fi, Bluetooth, etc.)

A configuration, according to some embodiments, may be represented as a data structure, which may include any number or variety of data types, and any number of entries representing criteria, attributes, values, etc. Additionally, configurations may be flat or hierarchical, including inheritance of certain criteria, attributes, and/or values accordingly, for example. For purposes of configurations, according to some embodiments, values may be included as thresholds or benchmarks for comparison against actual values in a data set, for example.

In some embodiments, criteria may represent a status of a process for determining qualification of items or entities in ERP system, for example. Qualification may be based on whether certain attributes correspond to certain values for a given criterion or set of criteria, in some cases. As a further example of a practical implementation, given a configuration specified by a user, a qualification process may be automated per subsequent parts of method 900. In some embodiments, the qualification process may refer to predetermined values for specified attributes, which may differ depending on a given criterion or status, e.g., a given stage of a multistage qualification process, for example.

In 904, processor 1004 may be configured to access a data set of one or more items. In some embodiments, a data set may be structured, such as in a row- or column-oriented database. For example, columns may correspond to attributes, rows may correspond to unique items, and values stored therein may be evaluated according to various criteria or predetermined values for comparison. Further embodiments may include spreadsheets or text files having designated delineators, e.g., comma-separated values (CSV), etc., or other data-store implementations for key-value pairs, for example. Some embodiments may include unstructured data and a separate interface to retrieve values corresponding to attributes. Further examples are described herein with respect to databases. In some embodiments, some items may have null values for certain attributes, which may or may not affect how the items or attributes may be evaluated for certain criteria, for example. Additionally, data sets may be flat or hierarchical, including inheritance of certain attributes and/or values accordingly.

In some embodiments, items may be line items in a list, and may include attributes or entities for qualification, approval, and/or entry into an ERP system, for example. As a further example of a practical implementation, items may correspond to products, components or materials thereof, or other inventory, any of which may have further attributes such as geographical identifiers, source identifiers (e.g., place of origin, supplier, etc.), destination identifiers, subset identifiers (e.g., components of a given item), superset identifiers (e.g., products in which the given item may be a component), other descriptors (e.g., shape, size, color, other specifications), or the like, to name a few non-limiting examples. Additionally, or alternatively, a given item may be characterized by any attribute corresponding to the item, or value of an attribute. At least one attribute may be a unique identifier (UID), for example, such as a line-item number or row ID, in some embodiments. Example data sets may be found in FIG. 2 or FIG. 3 as described further above. Charts 200 and 300 of FIGS. 2 and 3, respectively, each include columns that represent attributes, e.g., Material, Region, Locality, Supplier, etc., which may have different values, e.g., identifiers or descriptors, for some line items.

In 906, processor 1004 may be configured to compute a first key based at least in part on the first configuration. In some embodiments, the first key may uniquely correspond to the first configuration. For example, any attributes and any corresponding values (e.g., key-value pairs) or other criteria in a given configuration may be transformed into a composite value that may be unique for a given input and deterministic, allowing equal inputs to be transformed into identical outputs. In some embodiments, inputs may be per item, per attribute, or per group(s) of attributes. Additionally, or alternatively, in some embodiments, the outputs may be smaller in physical and/or logical size than their corresponding inputs and/or may be grouped into set(s) of multiple keys per data set and/or per criterion or set of criteria. Non-limiting examples of such transforms or transformation may be checksums or cryptographic hash functions. Other mathematical transformations may serve equivalent, adequate functionality for purposes of this disclosure, which may be achieved using generalized or specialized algorithms, data structures, or any combination thereof, in some embodiments.

Following the example criteria described above with respect to FIG. 3, Supplier 1 may be qualified to supply laptops only in one geographic scope (e.g., USA, Michigan) and to supply tablets only in another geographic scope (e.g., EU, Germany), whereas Supplier 2 may be qualified to supply tablets (not other material types/values in the data set), and only in a different geographic scope (e.g., USA, all localities). Accordingly, processor 1004 may be configured to compute at least one key that may match items (e.g., identified by line item numbers) for which respective suppliers (e.g., identified by values of the Supplier attribute) are qualified to supply in a corresponding region and locality (e.g., identified by values of the Region and Locality attributes). To compute the key, a group or set of relevant values may be transformed and/or combined into at least one representation of qualification criteria, which may itself represent the key. In some embodiments, a combined group or set of relevant values may be further transformed (e.g., numerically) into a representation of a key that may be readily compared with other keys transformed in like manner, for example.

As an example of transforming values before combining into a group or set of relevant values, some values (e.g., "Tablet" or "EU") may be assigned a corresponding numeric value from an enumerated set, for example: EU=1, USA=2, Australia=3; Laptop=1, Tablet=2, Smartphone=3; Germany=1, Minnesota=2, Michigan=3; etc. Thus, where qualifying criteria include laptops supplied to USA, Michigan by Supplier 1, a transformed, combined set of relevant values (e.g., values of relevant attributes) may include a sequence of 1:2:3:1, or Laptop:USA:Michigan:Supplier_1. This sequence may be treated as a key by itself, in some embodiments, or else the sequence, or any value thereof, may be further transformed (e.g., per a hash function), into another value, in some embodiments.

Given that the qualifying criteria, in this example, also include tablets supplied to EU, Germany by Supplier 1, another sequence, e.g., 2:1:1:1, or Tablet:EU:Germany:Supplier_1, may be used as part of the first configuration. Further, where tablets supplied to USA anywhere are qualified from Supplier 2, a special value may be used for locality, e.g., 0, or a predefined maximum value for a given attribute, to name some non-limiting examples. Thus, an example sequence may be 2:2:0:2, or Tablet:USA:(any):Supplier_2, in some embodiments. In other embodiments, attributes not considered, or which may be any value, may be substituted with null values, e.g., 2:2::2, or may be represented by other special symbols, mathematical and/or logical operators, functional or non-functional placeholders, or a combination thereof, for example.

With keys covering the qualifying criteria in a given configuration, elements in a data set (e.g., line items in chart 300) may be evaluated according to the same transform(s) and/or combination(s) used to compute the key(s) in 906. Comparing keys with evaluated elements may allow efficient determinations of matching elements (e.g., qualifying line items), or non-matching elements (e.g., non-qualifying line items), in some embodiments. Hash function(s), mathematical algorithms, or equivalent transforms, may further facilitate such evaluation and/or comparison. Such matching or non-matching may be used as a condition for populating sets of selected or failed (non-selected) items, as described further below.

In 908, processor 1004 may be configured to populate a first set of selected items. The first set of selected items may include any item, of the data set of the one or more items, selected based at least in part on the first key. For example, items may be selected based on whether at least part of the item (e.g., at least one attribute in a configuration for a given criterion) matches or fails to match a key, for example. In some embodiments, populating a set may include iterating over the data set of the one or more items and comparing the first key with at least one item of the one or more items. Additionally, or alternatively, in some embodiments, comparing a key with an item may include transforming at least part of the item (e.g., at least one attribute in a configuration for a given criterion) in a manner similar to or different from a transformation performed in computing the key in 906 above, for example. In some embodiments, matching of all or part of a key with a transformed value or set of values may include statistical approximations within a confidence interval, fuzzy matching, and/or more complex matching or approximate matching, which may be based on further algorithms that may involve neural networks, artificial intelligence, or machine learning, to name a few non-limiting examples. In some embodiments, matching or failing to match a key with a compared value may include satisfying or failing to satisfy a condition of a comparison, e.g., equal to, greater than, less than, within range, or the like.

In some embodiments, processor 1004 may be further configured to populate at least one second set of selected items. The at least one second set of selected items may include any item, of the data set of the one or more items, selected based at least in part on at least one second key. This operation may function in a similar way to 908, in some embodiments, and the second key may be computed similarly to the first key as in 906, based on at least one second configuration received as in 902, accessing the same data set as in 904, for example. The second configuration may be distinct from the first configuration, in some embodiments.

In some embodiments, processor 1004 may be further configured to an additional set of selected items, wherein the additional set of selected items may include any item, of the data set of the one or more items, selected based at least in part on a modified first key. The modified first key may be a key computed based on a modified configuration, for example, where a user may have reconfigured or otherwise modified the first configuration. A user may reconfigure a given configuration, such as the first configuration, due to a change in qualification requirements pertaining to any item in the data set, for example. In some embodiments, the rest of this operation may function in a similar way to 908 with respect to the (original) first key—the modified key may be computed similarly to the first key as in 906, based on receiving the modified first configuration as in 902, accessing the same data set as in 904, for example.

In 910, processor 1004 may be configured to output the first set of selected items. For example, the first set of selected items may be rendered and displayed within a GUI, TUI, or CLI, for example. In some embodiments, output may be via an API as a data structure, which may be passed to a third-party front-end output or back-end database input, for example. Additionally, or alternatively, the output first set of selected items may be an intermediate object in a data flow, which may also be passed via an API, and which may be input to ERP or any other function, routine, program, script, etc., to trigger workflows based on the content of the first set of selected items, e.g., triggering ERP system entries and/or approvals. In some embodiments, further next steps may be triggered, e.g., creating or fulfilling orders.

Further, in 910 or 908, in some embodiments, processor 1004 may be further configured to populate a first set of complementary items. The first set of complementary items may include a complement of the first set of selected items, for example. The first set of complementary items may be generated based on the first set of selected items, in some embodiments. Additionally, or alternatively, the first set of complementary items may be populated together with the first set of selected items in 908 as a by-product of populating the first set of selected items, for example. In some embodiments, a set of complementary items may be items in a given data set that are not selected items.

For example, with reference to FIG. 3, where items designated by line-item numbers 2, 6, and 8 form a first set of selected items, items designated by line-item numbers 1, 3-5, and 7 may form a first set of complementary items. Sets of selected and/or complementary items may be determined irrespective of whether selection is determined by matching or failing to match a given key with a given item or part of an item, according to some embodiments. Another example of output of a set of complementary items may be in an error message and/or notification, such as the notification including an error message as shown in FIG. 8, described further above.

In accordance with other examples described herein, a set of selected items (or a set of complementary items) may correspond to items that pass qualification or fail qualification according to at least one criterion or set of criteria that may be specified with a given configuration. Additionally, or alternatively, a set of selected items (or a set of complementary items) may include or correspond to indications of qualified or failed items of a given data set to which at least one criterion or set of criteria are applied using a given configuration, based at least in part on the given configuration.

An example of output of a set of failed items may be in an error message and/or notification, such as the notification including an error message as shown in FIG. 8, described further above. The brighter highlighted items (lines of blank background) shown in FIG. 3 may be used to illustrate an alternative output of a set of selected items, for example. Additionally, or alternatively, the data set may include at least one field, column, or further attribute, for example, that may be updated to indicate whether a given line item is selected, not selected, qualified, not qualified, etc., according to some embodiments.

Figure 10:
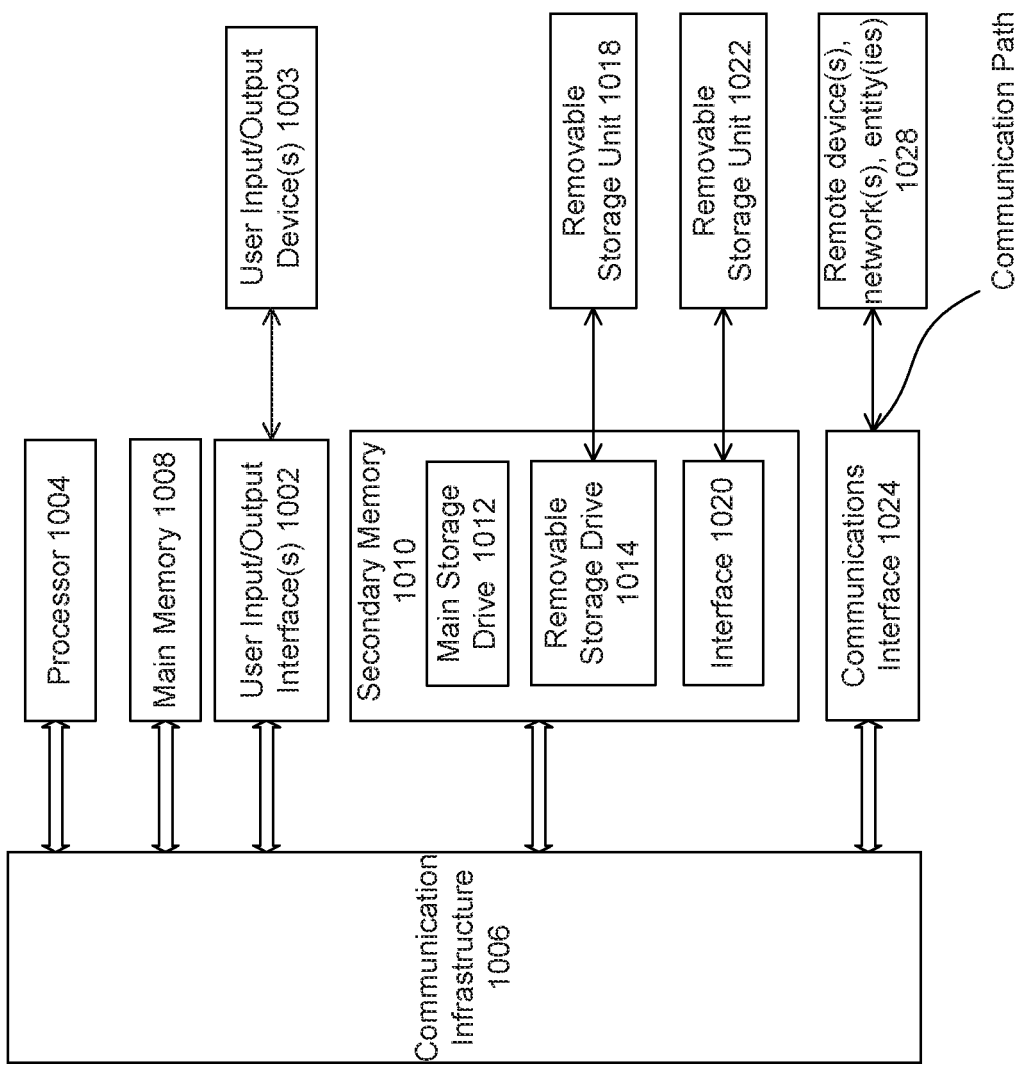
FIG. 10 is a block diagram of an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a bus or communication infrastructure 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography, including brute-force cracking, generating cryptographic hashes or hash sequences, solving partial hash-inversion problems, and/or producing results of other proof-of-work computations for some blockchain-based applications, for example.

Additionally, one or more of processors 1004 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or secondary memory 1010. Secondary memory 1010 may include, for example, a main storage drive 1012 and/or a removable storage device or drive 1014. Main storage drive 1012 may be a hard disk drive or solid-state drive, for example. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/ any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communication path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Such files may follow data models including but not limited to Universal Data Model (UDM), entry-attribute-value (EAV) model, object-attribute-value (OAV) model, vertical database model, open schema, closed schema, or any other standard, nonstandard, or proprietary data models. Configuration data may be structured, unstructured, in flat-file databases, column-oriented databases, row-oriented databases, or other types of database formats.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

For handling, extracting, abstracting, or analyzing information, any number of other paradigms or frameworks may be employed or interfaced with in the process, such as Unstructured Information Management Architecture (UIMA), Data Discovery and Query Builder (DDQB), General Architecture for Text Engineering (GATE), Named-Entity Recognition (NER), etc., or any non-standard or ad hoc approach that may be useful for processing, parsing, tagging, or contextualizing configuration information in any of the forms or models listed above.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

Embodiments disclosed herein may be implemented and/or performed with any database framework, regardless of specific operational capabilities, including well-known examples of database implementations such as Redis, SSDB, LevelDB, Bigtable, Bluefish, Cassandra, Hypertable, HyperDex, Coord, Druid, Accumulo, HBase, Ignite, Tarantool, Actord, Memcached, MemcacheQ, Repcached, JBoss Cache, Infinispan, Coherence, Hazelcast, Voldemort, Scalaris, Riak, KAI, KDI, Aerospike, ArangoDB, Berkeley DB, Cosmos DB, CouchDB, DocumentDB, DovetailDB, DynamoDB, FoundationDB, InfinityDB, LMDB, MemcacheDB, MongoDB, NMDB, ObjectivityDB, OrientDB, QuasarDB, RethinkDB, RocksDB, SimpleDB, ZopeDB, Mnesia, River, Virtuoso, Domino, eXtreme Scale, Clusterpoint, Couchbase, Perst, Qizx, MarkLogic, HSQLDB, H2, Dynomite, Shoal, GigaSpaces, OpenNeptune, DB4O, SchemaFree, RAMCloud, Keyspace, Flare, Luxio, MUMPS, Neo4J, Lightcloud, Cloudscape, Derby, Giraph, TokyoTyrant, c-TreeACE, InfiniteGraph, generic implementations of XML databases or dbm-compatible databases, or any other NoSQL database variant, for example.

This does not exclude any compatible SQL-like implementations, such as NewSQL architectures including MemSQL, NuoDB, VoltDB, Spanner, Gridgain, Trafodion, Clustrix, or other related solutions including MySQL Cluster, InnoDB, InfiniDB, TokuDB, MyRocks, Infobright, Vitess, Scalebase, and others. Other traditional SQL-based implementations such as Postgres (PostgreSQL), MariaDB, MySQL, DB2, MS-SQL, SQL Server, SQLite, SQL/PSM, PL/SQL, SQL PL, SPL, T-SQL, DML, ABAP, Open SQL, etc. Other relational databases may be adapted to benefit from techniques described herein. Other benefits realized from the techniques described herein apply similarly to big data on cluster-based platforms including Hadoop, HFS, GFS, HPCC, Sector, Sphere, Mahout, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method, the method comprising:
    receiving, by at least one processor, a first configuration corresponding to a plurality of attributes;
    accessing, by the at least one processor, a data set of one or more items;
    computing, by the at least one processor implementing at least one transform function, a first key based at least in part on the first configuration, wherein the first key, in accordance with the at least one transform function, uniquely corresponds to the first configuration;
    populating, by the at least one processor, a first set of selected items, wherein the first set of selected items comprises any item, of the data set of the one or more items, selected, according to an algorithm having a time complexity of less than exponential time, from the data set of the one or more items, based at least in part on the first key; and
    outputting, by the at least one processor, the first set of selected items,
    wherein the receiving, accessing, computing, populating, and outputting are performed by one or more computing devices comprising the at least one processor.

2. The computer-implemented method of claim 1, the outputting further comprising:
    populating, by the at least one processor, a first set of complementary items, wherein the first set of complementary items comprises a complement of the first set of selected items.

3. The computer-implemented method of claim 1, the outputting further comprising:
    receiving, by at least one processor, at least one second configuration corresponding to the plurality of attributes, wherein the first configuration is distinct from the at least one second configuration;
    computing, by the at least one processor, at least one second key based at least in part on the at least one second configuration, wherein the at least one second key corresponds uniquely to the at least one second configuration; and
    populating, by the at least one processor, at least one second set of selected items, wherein the at least one second set of selected items comprises any item, of the data set of the one or more items, selected based at least in part on the at least one second key.

4. The computer-implemented method of claim 1, the outputting further comprising:
    receiving, by at least one processor, a modified first configuration corresponding to the plurality of attributes, wherein the modified first configuration is based at least in part on the first configuration;
    computing, by the at least one processor, a modified first key based at least in part on the at least one second configuration, wherein the modified first key corresponds uniquely to the modified first configuration; and
    populating, by the at least one processor, an additional set of selected items, wherein the additional set of selected items comprises any item, of the data set of the one or more items, selected based at least in part on the modified first key.

5. The computer-implemented method of claim 1, wherein the populating comprises iterating over the data set of the one or more items and comparing the first key with at least one item of the one or more items.

6. The computer-implemented method of claim 1, wherein the first set of selected items comprises qualified items, wherein the qualified items are determined to satisfy configurable criteria, based at least in part on the first configuration.

7. The computer-implemented method of claim 1, wherein the first set of selected items comprises indications of qualified items of the data set of the one or more items, and wherein the qualified items are determined to satisfy configurable criteria, based at least in part on the first configuration.

8. A system, comprising memory and at least one computer processor configured to perform operations comprising:
    receiving a first configuration corresponding to a plurality of attributes;
    accessing a data set of one or more items;
    computing, using at least one transform function, a first key based at least in part on the first configuration, wherein the first key, in accordance with the at least one transform function, uniquely corresponds to the first configuration;

populating a first set of selected items, wherein the first set of selected items comprises any item, of the data set of one or more items, selected, according to an algorithm having a time complexity of less than exponential time, from the data set of the one or more items, based at least in part on the first key; and outputting the first set of selected items.

9. The system of claim 8, the operations further comprising:

populating, by the at least one processor, a first set of complementary items, wherein the first set of complementary items comprises a complement of the first set of selected items.

10. The system of claim 8, the operations further comprising:

receiving, by at least one processor, at least one second configuration corresponding to the plurality of attributes, wherein the first configuration is distinct from the at least one second configuration;

computing, by the at least one processor, at least one second key based at least in part on the at least one second configuration, wherein the at least one more second key corresponds uniquely to the at least one second configuration; and populating, by the at least one processor, at least one second set of selected items, wherein the at least one second set of selected items comprises any item, of the data set of the one or more items, selected based at least in part on the at least one second key.

11. The system of claim 8, the operations further comprising:

receiving, by at least one processor, a modified first configuration corresponding to the plurality of attributes, wherein the modified first configuration is based at least in part on the first configuration;

computing, by the at least one processor, a modified first key based at least in part on the at least one second configuration, wherein the modified first key corresponds uniquely to the modified first configuration; and populating, by the at least one processor, an additional set of selected items, wherein the additional set of selected items comprises any item, of the data set of the one or more items, selected based at least in part on the modified first key.

12. The system of claim 8, wherein the populating comprises iterating over the data set of the one or more items and comparing the first key with at least one item of the one or more items.

13. The system of claim 8, wherein the first set of selected items comprises qualified items, wherein the qualified items are determined to satisfy configurable criteria, based at least in part on the first configuration.

14. The system of claim 8, wherein the first set of selected items comprises indications of qualified items of the data set of the one or more items, and wherein the qualified items are determined to satisfy configurable criteria, based at least in part on the first configuration.

15. A non-transitory computer-readable storage medium having instructions stored thereon that, when executed by at least one computing device, cause the at least one computing device to perform operations comprising:

receiving a first configuration corresponding to a plurality of attributes;

accessing a data set of one or more items;

computing, using at least one transform function, a first key based at least in part on the first configuration, wherein the first key, in accordance with the at least one transform function, uniquely corresponds to the first configuration;

populating a first set of selected items, wherein the first set of selected items comprises any item, of the data set of one or more items, selected, according to an algorithm having a time complexity of less than exponential time, from the data set of the one or more items, based at least in part on the first key; and outputting the first set of selected items.

16. The non-transitory computer-readable storage medium of claim 15, the operations further comprising:

populating, by the at least one processor, a first set of complementary items, wherein the first set of complementary items comprises a complement of the first set of selected items.

17. The non-transitory computer-readable storage medium of claim 15, the operations further comprising:

receiving, by at least one processor, at least one second configuration corresponding to the plurality of attributes, wherein the first configuration is distinct from the at least one second configuration;

computing, by the at least one processor, at least one second key based at least in part on the at least one second configuration, wherein the at least one second key corresponds uniquely to the at least one second configuration; and populating, by the at least one processor, at least one second set of selected items, wherein the at least one second set of selected items comprises any item, of the data set of the one or more items, selected based at least in part on the at least one second key.

18. The non-transitory computer-readable storage medium of claim 15, the operations further comprising:

receiving, by at least one processor, a modified first configuration corresponding to the plurality of attributes, wherein the modified first configuration is based at least in part on the first configuration;

computing, by the at least one processor, a modified first key based at least in part on the at least one second configuration, wherein the modified first key corresponds uniquely to the modified first configuration; and populating, by the at least one processor, an additional set of selected items, wherein the additional set of selected items comprises any item, of the data set of the one or more items, selected based at least in part on the modified first key.

19. The non-transitory computer-readable storage medium of claim 15, wherein the populating comprises iterating over the data set of the one or more items and comparing the first key with at least one item of the one or more items.

20. The non-transitory computer-readable storage medium of claim 15, wherein the first selected set comprises at least one of (i) qualified items based at least in part on the first configuration or (ii) indications of the qualified items of the data set of the one or more items, and wherein the qualified items are determined to satisfy configurable criteria, based at least in part on the first configuration.

* * * * *